United States Patent Office 3,134,810

Patented May 26, 1964

1

2

3,134,810

N-(3-HALOPROPIONAMIDOMETHYL) ACRYLAMIDES

Andrew S. Tomcufcik, Tappan, N.Y., Stuart D. Willson, Park Ridge, N.J., and Adolph W. Vogel, Pearl River, N.Y., assignors to American Cyanamid Company, New York, N.Y., a corporation of Maine No Drawing. Filed Nov. 6, 1961, Ser. No. 150,125

4 Claims. (Cl. 260—561)

This invention relates to novel derivatives of acrylamide and, more particularly, is concerned with novel N-(3-halopropionamidomethyl)acrylamides which may be represented by the following formula:

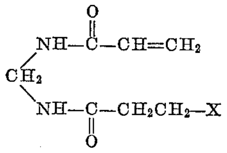

wherein X is halogen.

The novel compounds of the present invention have the physical and chemical properties characteristic of typical organic amides. They are generally white crystalline solids, relatively insoluble in water, but relatively soluble in alcohols, lower alkyl esters, acetone, benzene, toluene, chloroform, dioxane, lower alkoxyalkanols, dimethylformamide, dimethylsulfoxide, acetic acid, methylethyl ketone, diethyl ether, and the like.

The novel compounds of the present invention may be prepared by the interaction of a 3-halopropionamide, acrylamide, and formaldehyde. The N-(3-halopropionamidomethyl)acrylamides of the present invention require for their formation the combination of one mole of 3-halopropionamide with one mole of acrylamide for each mole of formaldehyde. In order to satisfy this requirement, one mole of 3-halopropionamide and one mole of acrylamide may be caused to react with one mole of formaldehyde according to the following equation:

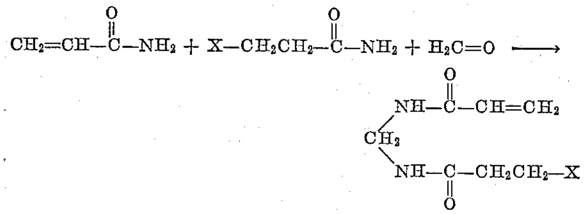

The reaction may be carried out by contacting the reagents in strongly acidic medium, ordinarily for a period of time ranging from a few minutes to an hour or more, and at a temperature ranging from 5° C. to 85° C.

It is also possible to carry out the reaction stepwise. That is, one mole of acrylamide may be caused to react with one mole of formaldehyde in the presence of an alkali to produce N-methylolacrylamide which in turn is converted to an N-(3-halopropionamidomethyl)acrylamide by reaction with one mole of 3-halopropionamide in the presence of strong acid. Alternatively, one mole of 3-halopropionamide may be caused to react with one mole of formaldehyde in the presence of an alkali to produce an N-methylol-3-halopropionamide which in turn is converted to an N-(3-halopropionamidomethyl)acrylamide by reaction with one mole of acrylamide in the presence of strong acid. Generally, the desired product may be recovered from the reaction mixture by concentration or by dilution with water.

The acid catalyst used in effecting the condensation of formaldehyde with acrylamide and a 3-halopropionamide is a mineral acid or an acid of a strength comparable to that of the mineral acids, i.e., hydrochloric acid, sulfuric acid, aromatic sulfonic acids such as toluenesulfonic acid, etc.

Obviously, the quantity of acid necessary to bring about reaction of acrylamide and a 3-halopropionamide with formaldehyde to produce the desired N-(3-halopropionamidomethyl)acrylamides according to this method will vary with and be dependent upon the acid used, its concentration, and similar factors. In general, however, we have found that the best yields are obtained if 0.01 to 1.0 equivalent of acid be used for each mole of acrylamide and 3-halopropionamide.

The condensation may be carried out in acidic media such as concentrated sulfuric acid, in which case the solvent functions as the catalyst. The condensation may also be carried out in inert solvents such as chloroform, carbon tetrachloride, ethylene dichloride and the like, to which the acid catalyst has been added.

Alternatively, the novel N-(3-halopropionamidomethyl)acrylamides of the present invention may also be prepared by substituting a 3-halopropionitrile for the 3-halopropionamide as the starting material. When hydrolysis of a nitrile is carried out prior to adding N-methylolacrylamide, standard hydrolytic conditions are employed. The nitrile is treated with strong acid in an aqueous medium at moderate temperature (20° to 50° C.) over a period of time ranging from less than an hour to several hours. Ordinarily the intermediate 3-halopropionamide is not isolated, but rather the N-methylolacrylamide is added to the hydrolysis mixture. The condensation then proceeds to completion during a period of time ranging from 10 to 60 minutes at a temperature of from 5° C. to 60° C. Alternatively, the 3-halopropionitrile and N-methylolacrylamide may be added together in a hydrolytic medium under the same conditions. Ordinarily, the product precipitates when the reaction mixture is diluted with water, and thus can be readily collected by filtration.

The monomeric N-(3-halopropionamidomethyl)acrylamides of the present invention may be readily copolymerized with other polymerizable unsaturated compounds such as, for example, vinyl chloride, vinyl acetate, acrylic acid, acrylic esters such as methyl acrylate, homologues of acrylic acid and acrylic esters such as the corresponding methacrylic derivatives, acrylonitrile, unsaturated alcohol esters of polybasic acids such as diallyl phthalate, unsaturated hydrocarbons such as butadiene, styrene, etc. Moreover, particularly useful copolymers may be formed by copolymerizing the monomeric N-(3-halopropionamidomethyl)acrylamides of the present invention with polyhydric alcohol esters of unsaturated polybasic acids, these esters being generally known in the art as unsaturated alkyd resins, and comprising such esters as ethylene glycol fumarate, diethylene glycol fumarate, etc.

The copolymerization of the N-(3-halopropionamidomethyl)acrylamides of the present invention is generally best accomplished by heat and/or light and/or in the presence of polymerization initiators such as azo-bis-isobutyronitrile.

It is an advantage of the novel compounds of the present invention that they may be copolymerized to form resins which are useful in molding compositions, in laminating compositions, and in coating compositions in general.

In addition, the novel compounds of the present invention possess the property of inhibiting the growth of certain types of neoplasia in experimental animals, when administered orally or parenterally. The compounds of the present invention were tested against the tumors Sarcoma 180, Lymphosarcoma $6C_3HED$ and Adenocarcinoma 72j. Tumors from donor mice were minced and the particles transplanted, using a trocar, and inserted subcutaneously into the axillary region of a $C_3H$ inbred strain of mice. When the tumors had grown to a palpable size (5–14 days) depending on the particular tumor, the test mice were grouped according to tumor size and treatment was started. An exception was the Lymphosarcoma $6C_3HED$ in which treatment was started 2 to 3 days after implant before tumors were palpable. Treatment was by daily intraperitoneal injection for 6 days. Tumor harvest was on the seventh day following the first treatment. The tumors were weighed after excision and the following "activity ratio" was determined.

Activity ratio $$=\frac{\text{Average weight of tumors from control mice}}{\text{Average weight of tumors from treated mice}}$$

A compound was judged active if its "activity ratio" exceeded 3.50 in the case of Sarcoma 180, 6.39 in the case of Lymphosarcoma $6C_3HED$, and 3.72 in the case of Adenocarcinoma 72j.

The following table summarizes the testing results for the compounds of the present invention.

TABLE I

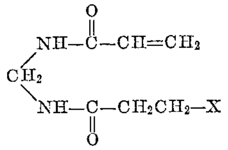

| X | Anti-Tumor Activity | | |
|---|---|---|---|
| | 180 | 72j | $6C_3HED$ |
| Cl | Inactive | Active | Inactive. |
| Br | Active | Active | Active. |
| I | Inactive | Active | Inactive. |

It is indeed surprising that the analogous N-(2,3-dibromopropionamidomethyl)acrylamide is completely inactive against Sarcoma 180, Lymphosarcoma $6C_3HED$ and Adenocarcinoma 72j.

The invention will be described in greater detail in conjunction with the following specific examples.

*Example 1.—Preparation of N-(3-Chloropropionamidomethyl)Acrylamide*

A solution of 7.0 g. (0.078 mole) of 3-chloropropionitrile and 5.1 g. (0.050 mole) of N-methylolacrylamide in 7 ml. of acetic acid was added to 50 ml. of concentrated sulfuric acid at 30° C. After 4 hours, the solution was poured on ice and the solid was filtered off, washed with water, sodium bircarbonate solution, and then again with water. There was obtained 5.1 g. (55% yield) of N-(3-chloropropionamidomethyl)-acrylamide, M.P. 177–183° C. After recrystallization from acetone-benzene, there was recovered 3.7 g., M.P. 189–190° C.

*Example 2.—Preparation of N-(3-Bromopropionamidomethyl)Acrylamide*

To 45 g. (0.40 mole) of 87% sulfuric acid was added 26.8 g. (0.20 mole) of 3-bromopropionitrile at 35–40° C. After five and one-half hours, 20.5 g. (0.20 mole) of N-methylolacrylamide was added during 25 minutes at 35–40° C. After 10 minutes the solution was diluted to 125 ml. with ice and water. This gave 27.5 g. (59% yield) of N-(3-chloropropionamidomethyl)acrylamid,e M.P. 170–174° C. dec. Recrystallization from aqueous acetone gave a 75% recovery, M.P. 177–178° C. dec.

*Example 3.—Preparation of N-(3-Iodopropionamidomethyl)Acrylamide*

A mixture of 3.98 g. (0.020 mole) of 3-iodopropionamide, 2.1 g. (0.020 mole) of N-methylolacrylamide, and 0.3 ml. of concentrated hydrochloric acid was refluxed 20 minutes in 70 ml. of ethylene dichloride and the hot solution was decanted from some tar that had separated. This gave 3.7 g. (66% yield) of N-(3-iodopropionamidomethyl)acrylamide, M.P. 162–166° C. Recrystallization from ethyl acetate raised the melting point to 165.5–167.5° C.

*Example 4.—Copolymerization of N-(3-Bromopropionamidomethyl)Acrylamide With Methyl Methacrylate*

In 5 ml. of dimethylformamide was dissolved 0.75 g. of N-(3-bromopropionamidomethyl)acrylamide, 2.0 g. of methyl methacrylate (uninhibited), and 0.01 g. of azo-bis-isobutyronitrile. The reaction mixture was degassed three times, sealed under vacuum, and heated at 60° C. for 24 hours. There resulted a rubbery solid which, upon being heated under vacuum, lost solvent and became a hard mass. This copolymer had no definitive melting point and was insoluble in all ordinary organic solvents. It could be molded under heat and pressure into useful white castings which had a fair degree of flexibility.

*Example 5.—Copolymerization of N-(3-Bromopropionamidomethyl)Acrylamide With Acrylonitrile*

In 5 ml. of dimethylformamide was dissolved 0.75 g. of N-(3-bromopropionamidomethyl)acrylamide, 2.0 g. of acrylonitrile (uninhibited), and 0.01 g. of azo-bis-isobutyronitrile. The reaction mixture was degassed three times, sealed under vacuum, and heated at 60° C. for 24 hours. There resulted a rubbery solid which, upon being heated under vacuum, lost solvent and became a hard mass. This copolymer had no definitive melting point and was insoluble in all ordinary organic solvents. It could be molded under heat and pressure into useful amber castings which had a fair degree of flexibility.

*Example 6.—Copolymerization of N-(3-Bromopropionamidomethyl)Acrylamide With Styrene*

In 5 ml. of dimethylformamide was dissolved 0.75 g. of N-(3-bromopropionamidomethyl)acrylamide, 2.0 g. of styrene (uninhibited), and 0.01 g. of azo-bis-isobutyronitrile. The reaction mixture was degassed three times, sealed under vacuum, and heated at 60° C. for 24 hours. There resulted a rubbery solid which, upon being heated under vacuum, lost solvent and became a hard mass. This copolymer had no definitive melting point and was insoluble in all ordinary organic solvents. It could be molded under heat and pressure into useful white castings which had a fair degree of flexibility.

This application is a continuation-in-part of our copending application Serial No. 23,644, filed April 21, 1960, now abandoned.

What is claimed is:

1. N-(3 - halopropionamidomethyl)acrylamide having the formula:

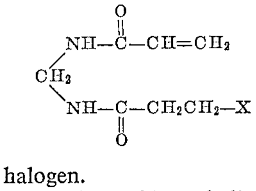

wherein X is a halogen.

2. N-(3-chloropropionamidomethyl)acrylamide.

3. N-(3-bromopropionamidomethyl)acrylamide.

4. N-(3-iodopropionamidomethyl)acrylamide.

References Cited in the file of this patent

UNITED STATES PATENTS 2,576,501 Dalton ---------------- Nov. 27, 1951